(12) United States Patent
Choi

(10) Patent No.: US 7,619,903 B2
(45) Date of Patent: Nov. 17, 2009

(54) SWITCHING MODE POWER SUPPLY AND A METHOD OF OPERATING THE POWER SUPPLY IN A POWER SAVE MODE

(75) Inventor: Jong-moon Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 402 days.

(21) Appl. No.: 11/397,552

(22) Filed: Apr. 5, 2006

(65) Prior Publication Data
US 2007/0097715 A1    May 3, 2007

(30) Foreign Application Priority Data
Oct. 28, 2005    (KR) .................. 10-2005-0102073

(51) Int. Cl.
  G05F 1/577    (2006.01)
  H02M 3/335   (2006.01)
(52) U.S. Cl. ..................... 363/20; 323/267; 307/82; 307/83
(58) Field of Classification Search ............ 363/15, 363/16, 20, 21.01, 21.04, 21.08, 21.1, 21.11, 363/21.12, 21.16, 21.18, 97, 131; 307/31, 307/38, 39, 58, 75, 82, 83, 34; 323/267
See application file for complete search history.

(56) References Cited
U.S. PATENT DOCUMENTS
5,291,386 A * 3/1994 Wu .................... 363/21.05
5,852,550 A * 12/1998 Majid et al. ............ 363/21.05
6,408,148 B1 * 6/2002 Yamamoto ................ 399/88
7,423,893 B2 * 9/2008 Kogel et al. ............... 363/89

FOREIGN PATENT DOCUMENTS
| JP | 2000-354371 | 12/2000 |
| JP | 2002-218749 | 8/2002 |
| JP | 2002-315329 | 10/2002 |
| KR | 96-43407 | 12/1996 |
| KR | 1020040025372 | 3/2004 |

* cited by examiner

Primary Examiner—Gary L Laxton
(74) Attorney, Agent, or Firm—Stanzione & Kim LLP

(57) ABSTRACT

A switching mode power supply and a method of operating the power supply in a power save mode. The switching mode power supply includes a first PWM controller and a second PWM controller that are driven by different driving voltages and control first and the second voltages to be output, respectively, a first transformer that is controlled by the first PWM controller to output the first voltage and having a primary coil, a secondary coil to induce the first voltage, and an auxiliary winding, and a rectifier that rectifies and smoothes a current flowing through the auxiliary winding of the first transformer, generates a power save mode voltage based on the respective driving voltages of the first and the second PWM controllers, and supplies the power save mode voltage to the first and the second PWM controllers. Accordingly, the power save mode is operated using a voltage difference without requiring an extra controller.

17 Claims, 2 Drawing Sheets

SWITCHING MODE POWER SUPPLY AND A METHOD OF OPERATING THE POWER SUPPLY IN A POWER SAVE MODE

CROSS-REFERENCE TO RELATED APPLICATIONS

This application claims the benefit under 35 U.S.C. § 119 of Korean Patent Application No. 2005-102073, filed on Oct. 28, 2005, in the Korean Intellectual Property Office, the entire content of which is incorporated herein by reference.

BACKGROUND OF THE INVENTION

1. Field of the Invention

The present general inventive concept relates to a switching mode power supply and a method of operating a power supply in a power save mode. More particularly, the present general inventive concept relates to a switching mode power supply that outputs at least two voltages and operates in a power save mode using a voltage difference when a minimum load is applied, and a method of operating in a power save mode.

2. Description of the Related Art

Since a conventional switching mode power supply (SMPS) operates a switching element in a switching mode, it consumes less power. Also, since the SMPS uses a high frequency power transformer, the SMPS is compact-sized and light-weight. It is possible for the SMPS to output different levels of direct current (DC) voltages at the same time. For example, if a printer employs the SMPS, it is possible for the printer to be supplied with a 3.3V or 5V (DC) voltage from a main power supply and a 24V (DC) voltage supplied from a high voltage power supply or a printer engine at the same time.

The SMPS enters a power save mode to minimize power consumption when the high voltage power supply or the printer engine that uses a high voltage is idle.

The conventional SMPS has at least two pulse width modulation (PWM) controllers and at least two transformers to output at least two voltages. The conventional SMPS receives a PWM on/off signal to control the output of the high voltage to turn off the second PWM controller such that the high voltage is not output in the power save mode.

More specifically, if a SMPS is designed to output two voltages for example, the SMPS includes two PWM controllers and two transformers.

It is assumed that a first PWM controller controls a low voltage output and a second PWM controller controls a high voltage output.

The first PWM controller outputs a PWM signal, and a first transistor switches on/off according to the PWM signal and thereby regulates a current flowing through a primary coil of a first transformer, and thus controls a voltage induced at a secondary coil of the first transformer. The voltage induced at the secondary coil at the first transformer is rectified, smoothed, and then output to a first output terminal as the low voltage. The second PWM controller and a second transistor generate a voltage in the same manner as described above and output the voltage to a second output terminal as the high voltage.

The conventional SMPS requires an external controller to output the PWM on/off signal to control the high voltage output from the second PWM controller to turn on/off (i.e. from on to off) when entering a power save mode. When receiving the PWM on/off signal from the external controller, the second PWM controller is shut down according to the received PWM on/off signal. That is, the second PWM controller stops outputting the high voltage when the PWM on/off signal is received.

That is, the SMPS has to receive the control signal in order to operate in the power save mode. Accordingly, the SMPS also requires the external controller to output the control signal.

SUMMARY OF THE INVENTION

The present general inventive concept provides a switching mode power supply to operate in a power save mode using a voltage difference generated internally without requiring an external controller to output a control signal in order to operate in the power save mode, and a method of operating in the power save mode thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a power supply which outputs a first voltage and a second voltage, including a first pulse width modulation (PWM) controller and a second PWM controller that are driven by different driving voltages to control the first and the second voltages to be output, respectively, a first transformer that is controlled by the first PWM controller to output the first voltage, the first transformer including a primary coil, a secondary coil, and an auxiliary winding, and a rectifier that rectifies and smoothes a current flowing through the auxiliary winding of the first transformer, generates a power save mode voltage based on the respective driving voltages of the first and the second PWM controllers, and supplies the power save mode voltage to the first and the second PWM controllers.

The power save mode voltage generated by the rectifier may be greater than or equal to the driving voltage of the first PWM controller, and the power save mode voltage may be less than the driving voltage of the second PWM controller.

The second PWM controller may be powered off by the power save mode voltage.

In the power save mode, an output terminal connected to a secondary coil of the first transformer may have a minimum load, and the rectifier may generate the power save mode voltage using a reduced current of the first transformer.

The power supply may further include a voltage lowering unit that lowers the power save mode voltage generated by the rectifier and supplies the lowered voltage to the second PWM controller.

The voltage lowering unit may include a first end connected to the rectifier and a second end connected to the second PWM controller.

The voltage lowering unit may either be a variable resistor or a regulator.

The foregoing and/or other aspects of the present general inventive concept are also achieved by providing a power supply switchable between a power save mode and a normal driving mode, the power supply including a first output unit, a second output unit, a PWM controller unit to control the first output unit to output a first output voltage in the power save mode and in the normal driving mode, and to control the second output unit to output a second output voltage in the normal driving mode and not to output the second voltage when in the power save mode, and a sensing unit to sense a load applied to at least one of the first and second output units and to select one of the power save mode and the normal driving mode based on the sensed load.

The foregoing and/or other aspects of the present general inventive concept are also achieved by providing a switching mode power supply usable with a high voltage power supply (HVPS) and/or a printer engine, the switching mode power supply including first and second output units, first and second transformers to provide first and second voltages to the first and second output units, respectively, a first PWM controller to drive the first transformer, a second PWM controller to drive the second transformer, and a sensing unit to drive the first and second PWM controllers using a driving voltage that is determined based on a load applied to at least one of the first and second output units.

The foregoing and/or other aspects of the present general inventive concept are also achieved by providing a switching mode power supply, including at least two output units to output different voltage levels including a high voltage, and a PWM switching unit to sense a load applied to the output units and to power OFF the output unit that outputs the high voltage when the load is determined to be a first load and to power ON the at least two output units when the load is determined to be a second load.

The foregoing and/or other aspects of the present general inventive concept are also achieved by providing a power supply, including at least two output units to output different voltage levels including a high voltage, at least two PWM controllers that are drivable by different voltages, and a sensing unit to sense a load applied to the output units and to power OFF the PWM controller that drives the output unit that outputs the high voltage when the load is determined to be in a first load state and to power ON the at least two PWM controllers when the load is determined to be in a second load state.

The foregoing and/or other aspects of the present general inventive concept are also achieved by providing a method of operating a power supply in a power save mode, the method including a first transformer to output a first voltage and having a primary coil, a secondary coil on which the first voltage is induced, and an auxiliary winding, and a second transformer to output a second voltage, and a first PWM controller and a second PWM controller that are driven by different driving voltages and control outputs of the first and the second transformers, respectively. The method includes rectifying and smoothing a current flowing through the auxiliary winding of the first transformer, generating a power save mode voltage based on the respective driving voltages of the first and the second PWM controllers using the rectified and smoothed current of the auxiliary winding, and supplying the generated power save mode voltage to the first and the second PWM controllers.

The power save mode voltage may be greater than or equal to the driving voltage of the first PWM controller, and the power save mode voltage may be less than the driving voltage of the second PWM controller.

The method may further include lowering the power save mode voltage using either a variable resistor or a regulator and supplying the lowered power save mode voltage to the second PWM controller.

The foregoing and/or other aspects of the present general inventive concept are also achieved by providing a method of operating a power supply in a power save mode, the method including automatically selecting a power supply mode using a difference between driving voltages to drive at least two PWM controllers that control the power supply to output at least two voltages.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
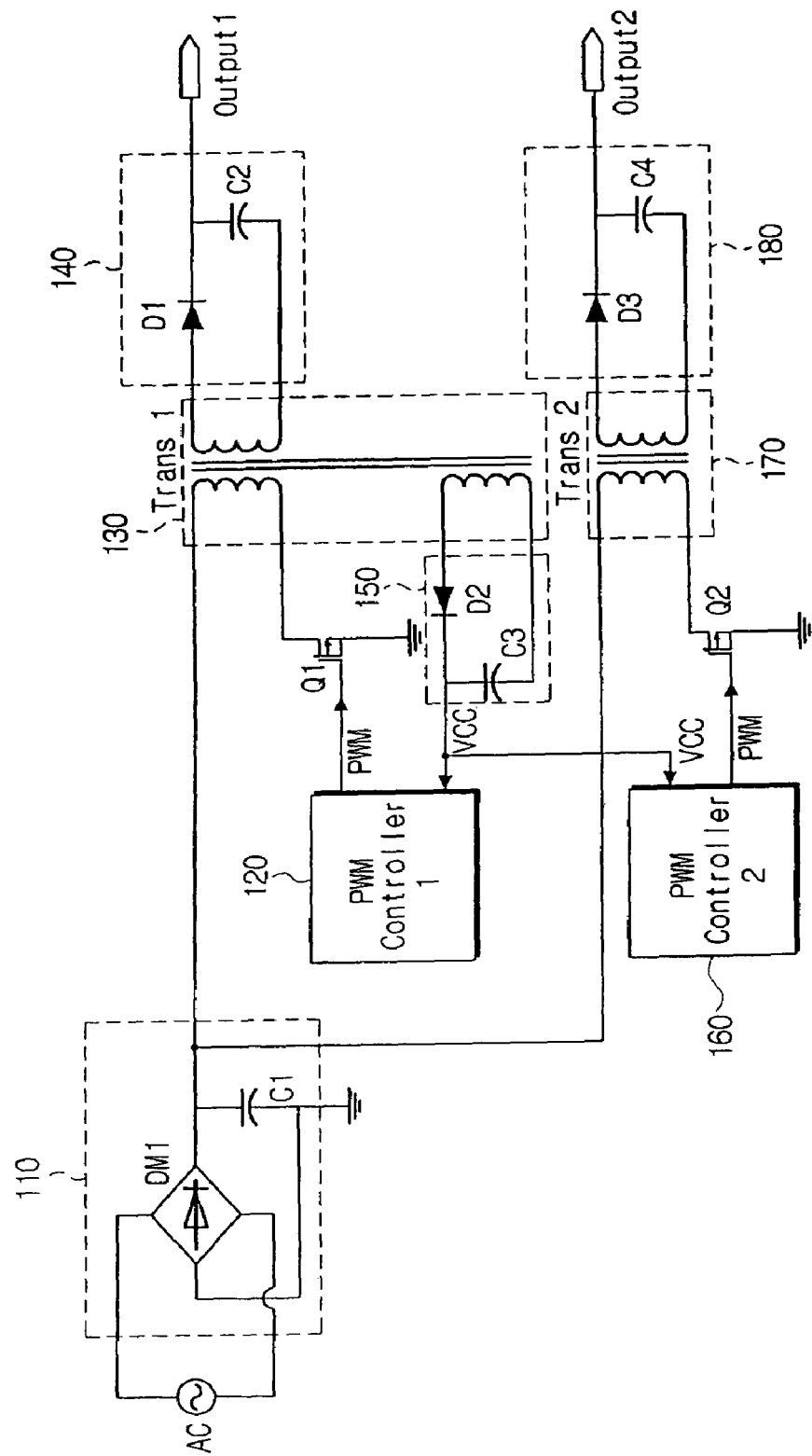
FIG. 1 is a circuit diagram illustrating a SMPS to operate in a power save mode according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a circuit diagram illustrating a SMPS to operate in a power save mode according to an embodiment of the present general inventive concept.

The SMPS powers on/off an output voltage using a voltage difference when a minimum load is applied, thereby operating in a power save mode.

Referring to FIG. 1, the SMPS includes a first rectifier 110, a first PWM controller 120, a first transistor Q1, a first transformer 130, a second rectifier 140, a third rectifier 150, a second PWM controller 160, a second transistor Q2, a second transformer 170, and a fourth rectifier 180.

The first rectifier 110 rectifies an alternating current (AC) voltage input from an AC power supply using, for example, a bridge diode DM1 and a capacitor C1.

The AC voltage rectified by the first rectifier 110 is applied to primary coils of the first transformer 130 and the second transformer 170. The first transformer 130 induces a voltage on a secondary coil using interaction between the primary coil and the secondary coil. The first PWM controller 120 outputs a first PWM signal to output a low voltage, and the first transistor Q1 switches on/off according to the first PWM signal, thereby regulating a current flowing through the primary coil of the first transformer 130. Accordingly, the voltage induced on the secondary coil of the first transformer 130 can be controlled according to the first PWM signal.

The first transistor Q1 switches on/off according to the first PWM signal output from the first PWM controller 120.

The second rectifier 140 rectifies and smoothes the voltage induced on the secondary coil of the first transformer 130 using, for example, a diode D1 and a capacitor C2, and outputs the rectified and smoothed voltage to a first output terminal (output1). The voltage output to the first output terminal (output1) is the low voltage.

The third rectifier 150 rectifies and smoothes a current flowing through an auxiliary winding of the first transformer 130 using, for example, a diode D2 and a capacitor C3, thereby generating a Vcc. The third rectifier 150 supplies the generated Vcc to the first and the second PWM controllers 120 and 160 as a driving voltage Vcc.

The first and the second PWM controllers 120 and 160 are driven by the Vcc supplied from the third rectifier 150, and the first and second PWM controllers 120 and 160 generate the first PWM signal and a second PWM signal, respectively.

The second transformer 170 receives the voltage from the first rectifier 110 onto the primary coil thereof to induce a voltage on the secondary coil of the second transformer 170 using an interaction between the primary coil and the secondary coil. The second PWM controller 160 outputs a second PWM signal to output a high voltage, and the second transistor Q2 switches on/off according to the second PWM signal, thereby regulating a current flowing through the primary coil of the second transformer 170. Accordingly, the voltage induced on the secondary coil of the second transformer 170 can be controlled according to the second PWM signal.

The second transistor Q2 switches on/off according to the second PWM signal output from the second PWM controller 160.

The fourth rectifier 180 rectifies and smoothes the voltage induced on the secondary coil of the second transformer 170 using, for example, a diode D3 and a capacitor C4, and outputs the rectified and smoothed voltage to a second output terminal (output2). The voltage output to the second output terminal (output2) is the high voltage.

The third rectifier 150 generates a normal driving voltage as the driving voltage Vcc to drive the first and the second PWM controllers 120 and 160 in a normal driving mode, and the third rectifier 150 generates a power save mode voltage as the driving voltage Vcc to enter the power save mode. The first and the second PWM controllers 120 and 160 use different driving voltages. The first PWM controller 120 uses a low level driving voltage, since the first PWM controller 120 outputs the first PWM signal to output the low voltage, whereas the second PWM controller 160 uses a high level driving voltage, since the second PWM controller 160 outputs the second PWM signal to output the high voltage. Accordingly, in the normal driving mode, both the first and the second PWM controllers 120 and 160 are driven (i.e., driven normally), and in the power save mode, the second PWM controller 160 that uses the high level driving voltage is powered off, and only the first PWM controller 120 is driven.

For example, the first PWM controller 120 may use a driving voltage of 12V and the second PWM controller 160 may use a driving voltage of 15V. Other voltages may alternatively be used. In the normal driving mode, the third rectifier 150 may generate the Vcc of 15V at a minimum to normally drive the first and the second PWM controllers 120 and 160. The first and the second PWM controllers 120 and 160 are normally driven by the voltage 15V.

In the power save mode, the first and the second output terminals (output1 and output2) have a minimum load applied thereto. Accordingly, a low level of current flows through the auxiliary winding of the first transformer 130 that is connected to the first output terminal (output1) such that the third rectifier 150 generates the Vcc of 12V at a maximum, which is lower than the 15V in the normal driving mode. Accordingly, the second PWM controller 160, which is to be driven by the voltage of 15V, is powered off and enters the power save mode.

In other words, when the minimum load is applied to the first and/or second output terminals (output1 and output2), current induced in the auxiliary winding of the first transformer 130 is reduced such that the driving voltage Vcc generated by the third rectifier 150 is a power save mode voltage (e.g., 12V.) that corresponds to a voltage that is high enough to drive the first PWM controller 120, but is not high enough to drive the second PWM controller 160. The current induced in the auxiliary winding of the first transformer 130 may result from interactions with the primary and/or secondary coil of the first transformer 130. More specifically, the current flowing through the auxiliary winding of the first transformer 130 may be a function of the load applied to the first output terminal (output1) on the secondary coil side of the first transformer 130. For example, the current induced in the auxiliary winding of the first transformer 130 may be proportional to the load applied to the first output terminal (output1). The minimum load may be applied to the first output terminal (output1) or the first and second output terminals (output1 and output2) when a high voltage power supply that uses the high voltage output by the second output terminal (output2) or a printer engine that is connected to the first output terminal (output1) is idle. Thus, the auxiliary winding of the first transformer 130 and the third rectifier 150 can automatically switch the SMPS into the power save mode by sensing the load applied to first and second output terminals (output1 and output2) without requiring an external control signal produced by an external controller. In other words, the auxiliary winding of the first transformer 130 may function as a sensing unit to sense the load that is applied to the output of the SMPS in order to generate the proper driving voltage Vcc for the first and second PWM controllers 120 and 160.

Figure 2:
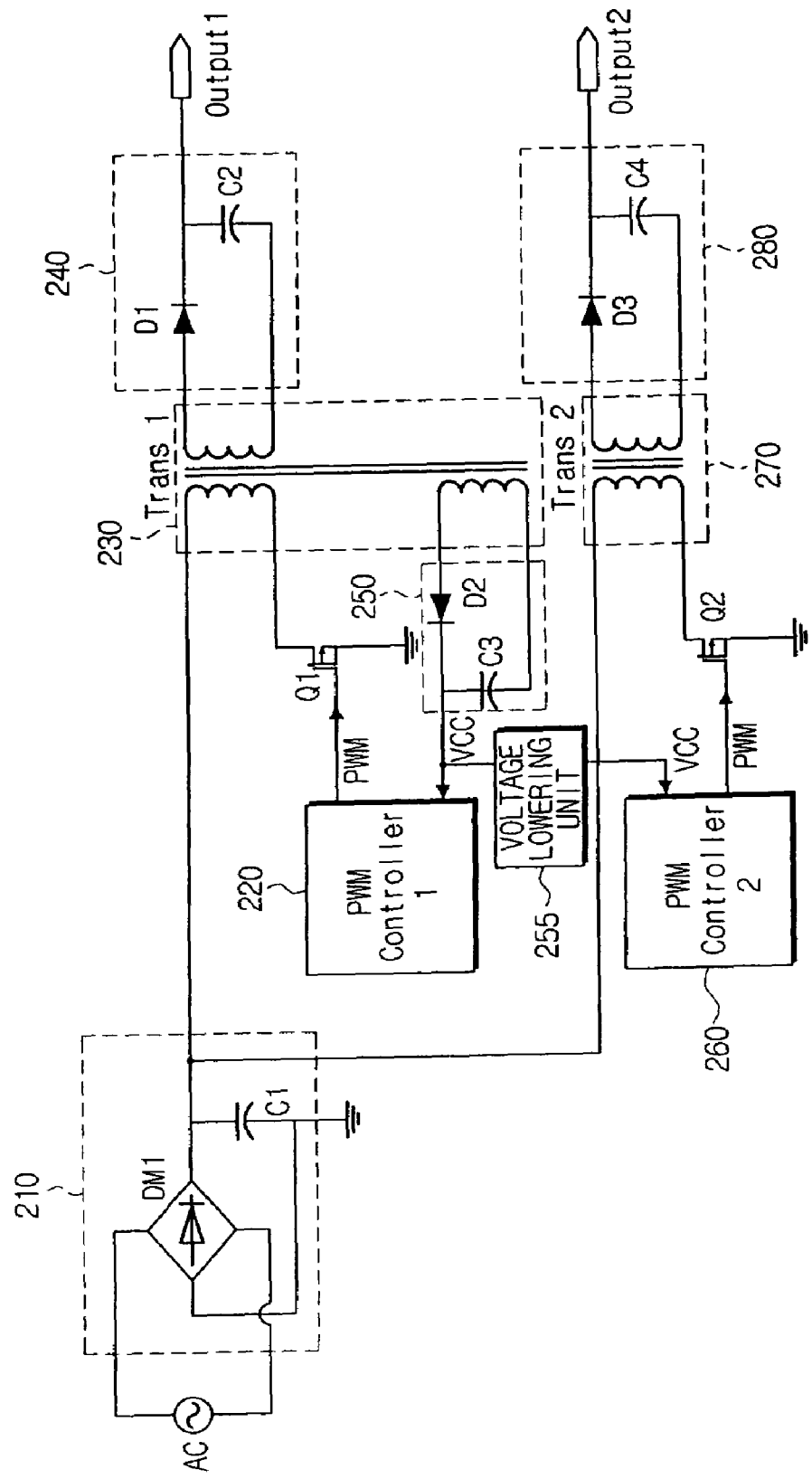
FIG. 2 is a circuit diagram illustrating a SMPS to operate in a power save mode according to another embodiment of the present general inventive concept.

FIG. 2 is a circuit diagram illustrating a SMPS to operate in a power save mode according to another embodiment of the present general inventive concept.

Referring to FIG. 2, the SMPS includes a first rectifier 210, a first PWM controller 220, a first transistor Q1, a first transformer 230, a voltage lowering unit 255, a second rectifier 240, a third rectifier 250, a second PWM controller 260, a second transistor Q2, a second transformer 270, and a fourth rectifier 280.

Since the first rectifier 210, the first PWM controller 220, the first transistor Q1, the first transformer 230, the second rectifier 240, the third rectifier 250, the second PWM controller 260, the second transistor Q2, the second transformer 270, and the fourth rectifier 280 may be similar to those corresponding elements of the SMPS of the embodiment of FIG. 1, detailed descriptions thereof will not be provided.

The voltage lowering unit 255 is disposed between the third rectifier 250 and the second PWM controller 260 and uses a voltage difference between a driving voltage applied as a Vcc to the second PWM controller 260 and a driving voltage applied as a Vcc to the first PWM controller 220. More specifically, the voltage lowering unit 255 lowers the driving voltage applied from the third rectifier 250 to the second PWM controller 260 to create a greater difference between the driving voltages applied from the first PWM controller 220 and from the second PWM controller 260.

In the power save mode, the third rectifier 250 generates a lower level voltage as the driving voltage Vcc than in a normal driving mode similar to the third rectifier 150 of FIG. 1. The voltage lowering unit 255 further lowers the low level voltage output as the driving voltage Vcc supplied from the third rectifier 250 to the second PWM controller 260. Accordingly, the second PWM controller 260, being applied with the driving voltage Vcc lowered by the voltage lowering unit 255, is powered off and enters the power save mode. The auxiliary coil of the first transformer 230 may operate in a similar manner as described above with respect to the auxiliary winding of the first transformer 130 of FIG. 1.

For example, the voltage lowering unit 255 may be realized by an additional circuit such as a variable resistor or regulator to lower the driving voltage Vcc generated by the third rectifier 250.

In the embodiments of the present general inventive concept, the SMPS outputs two voltages and can operate in a power save mode to generate one output voltage. However, this arrangement should not be considered as limiting the scope of the present general inventive concept. The method of operating in the power save mode may be applied to a SMPS that outputs more than two voltages.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply which outputs a first voltage and a second voltage, comprising:
   a first pulse width modulation (PWM) controller and a second PWM controller that are driven by different driving voltages to control the first and the second voltages to be output, respectively;
   a first transformer that is controlled by the first PWM controller to output the first voltage, the first transformer including a primary coil, a secondary coil, and auxiliary winding; and
   a rectifier that rectifies and smoothes a current flowing through the auxiliary winding of the first transformer, generates a power save mode voltage based on the respective driving voltages of the first and the second PWM controllers, and supplies the power save mode voltage to the first and the second PWM controllers.

2. The power supply as claimed in claim 1, wherein the power save mode voltage generated by the rectifier is greater than or equal to the driving voltage of the first PWM controller, and the power save mode voltage is less than the driving voltage of the second PWM controller.

3. The power supply as claimed in claim 2, wherein the second PWM controller is powered off by the power save mode voltage.

4. The power supply as claimed in claim 1, wherein, in a power save mode, an output terminal connected to the secondary coil of the first transformer has a minimum load, and the rectifier generates the power save mode voltage using a reduced current through the first transformer.

5. The power supply as claimed in claim 1, further comprising:
   a voltage lowering unit that lowers the power save mode voltage generated by the rectifier and supplies the lowered voltage to the second PWM controller.

6. The power supply as claimed in claim 5, wherein the voltage lowering unit comprises a first end connected to the rectifier and a second end connected to the second PWM controller.

7. The power supply as claimed in claim 5, wherein the voltage lowering unit comprises either a variable resistor or a regulator.

8. The power supply as claimed in claim 1, further comprising:
   first and second output terminals to output the first and second voltages from the first and second transformers, respectively.

9. The power supply as claimed in claim 8, wherein the auxiliary winding of the first transformer induces a current based on a load applied to at least the first output terminal such that the rectifier generates a driving voltage that corresponds to the current induced in the auxiliary winding.

10. The power supply as claimed in claim 9, wherein when the load applied to the first output terminal is a minimum load, the current induced in the auxiliary winding corresponds to the power save mode voltage.

11. The power supply as claimed in claim 9, wherein the auxiliary coil interacts with the secondary coil.

12. A method of operating a power supply in a power save mode, the power supply having a first transformer to output a first voltage and including a primary coil, a secondary coil, and an auxiliary winding, and a second transformer to output a second voltage, and a first PWM controller and a second PWM controller that are driven by different driving voltages and control outputs of the first and the second transformers, respectively, the method comprising:
   rectifying and smoothing a current flowing through the auxiliary winding of the first transformer;
   generating a power save mode voltage based on the respective driving voltages of the first and the second PWM controllers using the rectified and smoothed current of the auxiliary winding; and
   supplying the generated power save mode voltage to the first and the second PWM controllers.

13. The method as claimed in claim 12, wherein the power save mode voltage is greater than or equal to the driving voltage of the first PWM controller, and the power save mode voltage is less than the driving voltage of the second PWM controller.

14. The method as claimed in claim 12, further comprising:
   lowering the power save mode voltage using either a variable resistor or a regulator and supplying the lowered power save mode voltage to the second PWM controller.

15. The method as claimed in claim 12, further comprising:
   outputting the first and second voltages from the first and second transformers on first and second output terminals, respectively.

16. The method as claimed in claim 12, further comprising:
   inducing a current on the auxiliary coil of the first transformer based on a load applied to at least the first output terminal such that the rectifying and smoothing of the current flowing through the auxiliary winding of the first transformer comprises generating a driving voltage that corresponds to the current induced in the auxiliary coil.

17. The method as claimed in claim 16, wherein when the load applied to the first output terminal is a minimum load, the current induced in the auxiliary winding corresponds to the power save mode voltage.

* * * * *

UNITED STATES PATENT AND TRADEMARK OFFICE
CERTIFICATE OF CORRECTION

PATENT NO.       : 7,619,903 B2                                    Page 1 of 1
APPLICATION NO.  : 11/397552
DATED            : November 17, 2009
INVENTOR(S)      : Jong-moon Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 628 days.

Signed and Sealed this

Fourteenth Day of December, 2010

David J. Kappos
*Director of the United States Patent and Trademark Office*